United States Patent [19]

Peterson

[11] Patent Number: 4,957,362
[45] Date of Patent: Sep. 18, 1990

[54] METHOD AND APPARATUS FOR ELECTRO-OPTICAL PHASE DETECTION

[75] Inventor: Lauren M. Peterson, Ann Arbor, Mich.

[73] Assignee: Environmental Research Institute of Michigan, Ann Arbor, Mich.

[21] Appl. No.: 404,847

[22] Filed: Sep. 8, 1989

[51] Int. Cl.⁵ .......................... G01C 3/08; H04B 9/00; G02B 6/10

[52] U.S. Cl. ........................................ 356/5; 455/615; 455/616; 350/96.14

[58] Field of Search ................... 356/5; 455/615, 616; 350/96.14

[56] References Cited

U.S. PATENT DOCUMENTS

| | | | |
|---|---|---|---|
| 4,011,445 | 3/1977 | O'Meara | 356/4 |
| 4,514,054 | 4/1985 | Stowe | 350/96.15 |
| 4,830,486 | 5/1989 | Goodwin | 356/5 |
| 4,831,663 | 5/1989 | Smith | 455/616 |
| 4,893,352 | 1/1990 | Welford | 455/616 |

*Primary Examiner*—Stephen C. Buczinski
*Attorney, Agent, or Firm*—Krass & Young

[57] ABSTRACT

The present invention detects the difference in phase between the modulation of a received optical beam and a reference RF signal or a second modulated optical beam. The received optical beam is modulated by the reference signal and by this reference signal phase shifted 90 degrees. The difference cross modulation in these two modulated optical beams is detected. The phase difference to be detected is formed by dividing the difference cross modulation of the modulated second optical beam by the difference cross modulation of the modulated first optical beam. This quotient is proportional to the tangent of the phase difference to be detected. The optical modulation can be achieved by bulk electro-optic modulators operating on split beams, by a bulk electro-optic modulator alternatively modulating a single beam by the reference signal and the phase shifted version of the reference signal, or by changing the coupling between two parallel, matched wave guides in an integrated optic device. This system is useful in elimination of amplitude-phase cross talk in phase shift modulation optical communications systems and in three dimensional optical ranging systems.

19 Claims, 3 Drawing Sheets

METHOD AND APPARATUS FOR ELECTRO-OPTICAL PHASE DETECTION

Technical Field of the Invention

The technical field of the present invention is in phase detection of amplitude modulated optical radiation such as employed in optical communication and ranging.

BACKGROUND OF THE INVENTION

The present invention concerns detection of phase shift modulation in amplitude modulated optical radiation. Such phase shift modulation is employed in laser communications and in laser ranging.

In laser communications systems of this type a laser beam is amplitude modulated by a lower frequency signal, typically in the radio frequency (RF) signal range. Information is imparted to the RF modulation signal by phase shift modulation relative to a stationary signal. The information is extracted at the receiver by demodulation of the phase shift modulation signal.

Laser ranging systems include the so called "three dimensional" laser imaging systems. These systems permit the detection of the range to every picture element of a scene. In such systems the scene to be imaged is illuminated by a laser and the reflected signal is received and detected via a sensor. Typically the laser and the sensor with their accompanying optics are disposed side-by-side or along the same optical axis so that the laser illuminates the same small area of the scene as viewed by the sensor. The scene to be imaged is scanned by moving this combination or by using moving reflectors.

Modulation of the laser source enables range information to be obtained. The laser source is modulated with an RF signal. This modulation signal is extracted from the reflected signal received by the sensor. The modulation signal in the reflected signal is phase shifted from the original modulation signal by an amount equal to the round trip transit time.

In the prior art the received signal is detected via a photosensor. The photosensor output is amplified and the signal demodulated to extract the modulation signal. The extracted modulation signal is compared with the signal of the original modulation source to determine the phase difference. This phase difference corresponds to the information imparted in a communication system. In a three dimensional laser imaging system this phase difference is a measure of the range to the area currently viewed by the sensor. In three dimensional laser imaging systems the modulation frequency is selected so that the range measurements of interest, which may be the relative ranges of a feature rather than the total range, are less than the 360 degree phase ambiguity inherent in this technique.

There is a problem with such a system that causes the accuracy of phase difference detection to be reduced. The magnitude of the received signal can vary by several orders of magnitude. In communications systems this variation is primarily due to variations in range or alignment between the transmitter and the receiver, or due to attenuation along the propagation channel. In three dimensional laser imaging systems the amplitude of the received signal may vary due to regions of differing reflectivity within the scene, or by random interference effects within the reflected radiation which is known as speckle. The electronic amplifier coupled to the photosensor typically has a differing phase shift dependent upon the magnitude of the signal received. Thus the strength of the received signal interferes with the accuracy of the phase difference measurement. This problem is called amplitude-phase crosstalk. There have been previous attempts to reduce this amplitude dependent phase shift in the amplifier or to measure and correct for this crosstalk with limited success.

There is therefore a need for a phase difference detector which has a minimum of amplitude-phase crosstalk.

SUMMARY OF THE INVENTION

The present invention detects the difference in phase between the modulation of a received optical beam and a reference signal. The received optical beam is phase modulated by the reference signal thereby producing a modulated first beam. The difference cross modulation in this modulated first beam between the modulation of the received optical beam and the modulation by the reference signal is detected. The received optical beam is also modulated by a 90 degree phase shifted version of the reference signal thereby producing a modulated second beam. The difference cross modulation in this modulated second beam between the modulation of the received optical beam and the modulation by the phase shifted reference signal is detected. The phase difference to be detected is formed by dividing the difference cross modulation of the modulated second beam by the difference cross modulation of the modulated first beam. This quotient is proportional to the tangent of the phase difference to be detected.

In a first embodiment the modulation takes place in bulk electro-optic modulators. The received optical beam is split into two beams. The first beam is modulated by the reference RF signal and the second beam is modulated by the reference RF signal shifted by 90 degrees. Each of these bulk electro-optic modulators causes a change in the proportion of polarized light passing therethrough. A polarization analyzer separates the perpendicular linear polarizations for separate detection. The difference between the detected signals yields the cross modulation between the RF modulation originally imparted to the optical beam and the RF modulation imparted in the bulk electro-optic modulator. A low pass filter separates out the DC term of this cross modulation, which is proportional to the cosine of the phase difference angle for the light beam modulated by the reference RF signal and the sine of the phase difference angle for the light beam modulated by the 90 degree phase shifted reference RF signal. A division circuit forms the tangent of the phase difference angle.

In a second embodiment, only a single optical beam is employed. The bulk electro-optic modulator is alternately switched between the reference RF signal and the phase shifted version of the reference RF signal. The apparatus saves the detected low pass filter outputs in order to form the quotient.

The modulation takes place in an integrated optic device in accordance with a further embodiment of the invention. The modulation takes place by changes in the coupling between two parallel, matched optical wave guides. This process is very similar to that of the bulk electro-optic modulators and employs similar post processing.

BRIEF DESCRIPTION OF THE DRAWINGS

These and other objects and aspects of the present invention will become clear from the following detailed description of the invention, taken in conjunction with the drawings, in which.

DETAILED DESCRIPTION OF THE PREFERRED EMBODIMENTS

The objects of the present invention are achieved by changing the manner of detection of the phase difference between the reference signal and the modulation of the received signal. The present invention optically modulates the received signal by both an in-phase and a quadrature version of the reference signal. These modulated versions of the received signal are detected. The phase difference between the reference signal and the modulation of the received signal is extracted as the beat frequency in the in-phase and quadrature channels. The quotient of the in-phase signal and the quadrature signal yields the tangent of the phase difference angle. Thus the phase difference angle can be determined. In effect, the phase difference angle is detected optically prior to the photodetector and prior to any electronic amplifier which can introduce amplitude-phase crosstalk.

The present application will describe the phase difference detector in the context of a three dimensional laser ranging system. Those skilled in the art would realize that this is an example only and that the phase difference detector of the present invention can be employed in other contexts, such as in phase shift modulated communications systems.

Figure 1:
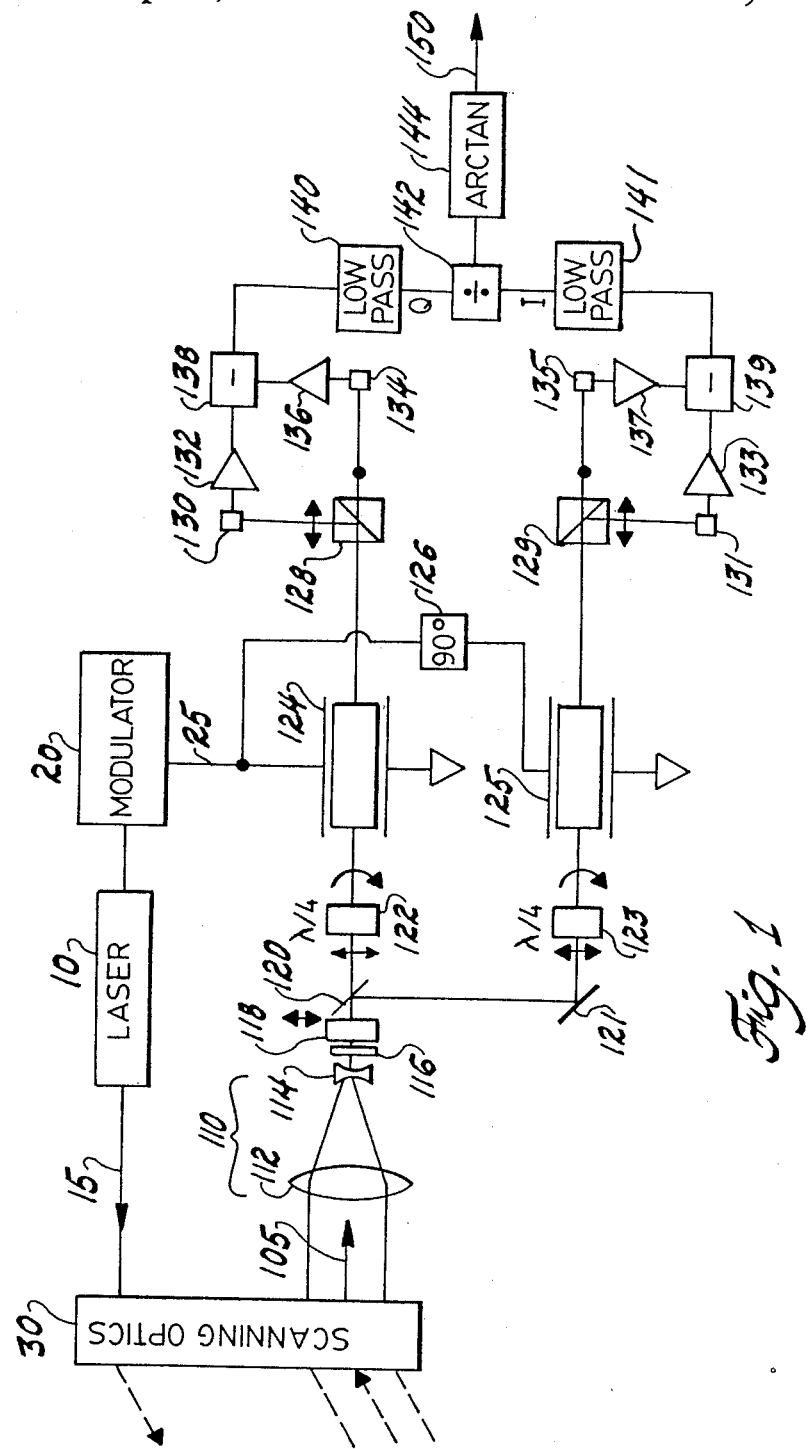
FIG. 1 illustrates a first embodiment of the present invention employing two electro-optic modulators.

FIG. 1 illustrates a first embodiment of the present invention. FIG. 1 shows laser 10 producing a beam of light 15. Laser 10 has its light output modulated by RF modulator 20, which also generates a reference RF signal 25 for use in the phase difference angle detection. Conventional scanning optics 30 steers the beam of light 15 to sequentially illuminate the scene of interest. Scanning optics 30 simultaneously steers the portion of the scene reflecting received light 105 originating from the area illuminated by the beam of light 15.

Other parts illustrated in FIG. 1 form the phase difference angle detection receiver. The received light 105 is received via an optical system 110, here illustrated as including convex lens 112 and concave lens 114. Those skilled in the art would realize that other, more complex lens systems could be employed as well as optical systems using reflectors. It is only necessary that optical system 110 gather and concentrate received light 105 which originated from laser 10. Optical band pass filter 116 has a pass band which includes the wavelength of the beam of light 15. Optical band pass filter 116 serves to reduce the reception of light from the scene other than light from laser 10. The received light 105 is next passed through a linear polarizer 118. In some applications linear polarizer 118 is aligned with the linear polarization of laser 10. In other applications linear polarizer 118 is aligned perpendicular to laser 10 to receive cross polarized reflections. The orientation of linear polarizer 118 is selected with consideration of the nature of the objects of interest in the scene viewed in accordance with the prior art in a manner which is not relevant to the present invention.

The received light is then separated into two channels. This is accomplished by beam splitter 120, which is preferably a dielectrically coated plate or a half-silvered mirror. It is believed best that the two split beams be of approximately equal strength. Each of the split beams is then processed separately. Because of the later processing, these two beams will be referred to as the quadrature and the in-phase beams. Note that FIG. 1 illustrates a mirror 121 in only the in-phase beam producing slightly differing optical path lengths. Exact matching of the optical paths of the two beams is not necessary. It is only required that the path length difference between the two beams causes a phase difference angle much less than the phase difference angle to be measured in the RF modulation.

Each split beam passes through an identical optical path. The split beams pass through respective quarter wave plates 122 and 123, respective electro-optic modulators 124 and 125 and respective polarizers 128 and 129.

Quarter wave plates 122 and 123 are optimized for the wave length of laser 10 to shift the electric field of one polarization component by a quarter wave length. This changes the linearly polarized light into circularly polarized light.

The circularly polarized light is modulated via electro-optic modulators 124 and 125. Each electro-optic modulator 124 and 125 is a bulk crystal whose polarization is dependent upon an applied electrical signal voltage. As further detailed below, the transfer characteristic of these devices is of the form of sine-squared function of applied voltage. The signal voltage applied to each electro-optic modulator is selected with regard to the transfer characteristic to provide a nearly linear modulation The provision of the quarter wave plates 122 and 123 serves to permit this to be achieved with zero-centered voltages. Electro-optic modulator 124 is supplied with the reference RF signal 25 from modulation source 20. Electro-optic modulator 125 is supplied with the reference RF signal 25 from modulation source 20 as phase shifted via ninety degree phase shift circuit 126. Ninety degree phase shift circuit 126 is constructed to provide a ninety degree phase shift at the frequency of modulator 20.

The light output from the electro-optic modulators 124 and 125 next pass through matched polarization analyzers 128 and 129, respectively. Polarization analyzers 128 and 129 separate the light received into two separate beams with perpendicular linear polarizations. Photodetector 130 receives and detects the parallel polarization light from polarization analyzer 128. Photodetector 134 detects the perpendicular polarization light from polarization analyzer 128. Similarly, photodetectors 131 and 135 detect the parallel and perpendicular polarizations of light from polarization analyzer 129, respectively.

The intensities at the respective photodetectors are determined by the original intensity of the received signal, the proportion of the light from beam splitter 120 for the particular channel, and the influence of the electro-optic modulator of that channel on the particular polarization of the detector. In each case there will be a term of the sum and difference of the phase shifted modulation of the received light and the modulation imparted by the particular electro-optic modulator, as well as a zero order signal or DC term. The receiver separates out the difference modulation term to detect the phase difference angle and hence the range.

The electrical signals from photodetectors 130, 131, 134 and 135 are amplified by amplifiers 132, 133, 136 and 137, respectively. Difference circuit 138 forms the difference between the output of amplifier 136 and amplifier 132. In a similar fashion, difference circuit 139 forms the difference between the output of amplifier 137 and amplifier 133. The difference signal from difference circuit 138 eliminates the DC term and includes a term proportional to the cosine of the phase difference angle, and is thus called the quadrature term. Low pass filter 140 extracts this cosine term from the output of difference circuit 138 and rejects the sum modulation term. The difference signal from the difference circuit 139 eliminates the DC term and includes a term proportional to the sine of the phase difference angle, and is thus called the in-phase term. Low pass filter 141 extracts this sine term from the output of difference circuit 139 and rejects the sum modulation term. Division circuit 142 forms the quotient of the output of low pass filter 141 divided by the output of low pass filter 140. Division circuit 142 may be an analog division circuit or it may be a digital circuit operating on digitized versions of the filtered difference signals. This quotient is proportional to the tangent of the phase difference angle and thus to the range of the currently illuminated portion of the scene. Arctangent circuit 144 forms the arctangent of the quotient from division circuit 142 and produces the phase difference angle at output 150. Arctangent circuit 144 may be an analog circuit, a digital computation circuit or a digital look-up table. The tangent function is employed rather than either the sine or cosine function due to its reduced angle ambiguity. This phase difference angle 150 is directly related to range in a manner known in the art.

The response of the system illustrated in FIG. 1 can now be calculated. Assuming that the range to the target is R, the modulation frequency is $\omega_m$, and c is the speed of light, then the phase difference angle $\Delta\phi$ is:

$$\Delta\phi = \frac{2R}{\lambda_m} = m \cdot 2\pi + \phi$$

where $\lambda_m$ is the modulation wavelength or $2\pi c/\omega_m$, m is an integer corresponding to the phase ambiguity and $\phi$ is the phase difference angle modulo-$2\pi$. If the modulation frequency is generally selected such that the phase ambiguity number $\omega_m$ is zero, or at least a single integer, then an unambiguous range determination is made at the expense of range resolution. Often only the relative range within a particular object is desired. In such a case, the modulation frequency $\omega_m$ is selected to provide unambiguous resolution within the relative range desired.

Each electro-optic modulator with its corresponding crossed polarizer has a sine-squared transfer function $\eta$:

$$\eta = \frac{I_{out}}{I_{in}} = \sin^2\left[\frac{\pi}{2} \frac{V}{V_{\pi/2}}\right]$$

where $I_{in}$ is the input radiation intensity, $I_{out}$ is the output radiation intensity, V is the voltage applied to the electrical terminal of the electro-optic modulator, and $V_{x/2}$ is the half-wave voltage of the electro-optic modulator. The quarter-wave plate in each beam shifts the response of each electro-optic modulator to be:

$$\eta = \sin^2\left[\frac{\pi}{2} \frac{V}{V_{\pi/2}} + \frac{\pi}{4}\right]$$

This quarter-wave shift serves to make the optical response of the electro-optic modulators nearly linear by shifting the operating point in the sine-squared response curve. Those skilled in the art would realize that this operating point shift could also be made by providing a bias in the applied voltage. For the first electro-optic modulator 124 the voltage $V_1$ applied to the electrical input terminal is:

$$V_1 = V_{m1}\sin\omega_m t$$

The voltage $V_2$ applied to the electrical input terminal of the second electro-optic modulator 125 is:

$$V_2 = V_{m2}\sin[\omega_m + 90°]$$
$$= V_{m2}\cos\omega_m t$$

The response of the system can now be computed. Let: $I_{D1}$, $I_{D2}$, $I_{D3}$ and $I_{D4}$ be the radiation intensities at photodetectors 134, 133 and 131, respectively; $I_{S1}$ be the intensity in the quadrature channel; and $I_{S2}$ be the intensity in the in-phase channel. Then:

$$I_{D1} = \tfrac{1}{2} I_{S1} [1 + \sin(\omega_m t + \phi)] \sin^2\left[\frac{\pi}{2} \frac{V_1}{V_{\pi/2}} + \frac{\pi}{4}\right]$$

$$I_{D3} = \tfrac{1}{2} I_{S1} [1 + \sin(\omega_m t + \phi)] \cos^2\left[\frac{\pi}{2} \frac{V_1}{V_{\pi/2}} + \frac{\pi}{4}\right]$$

$$I_{D2} = \tfrac{1}{2} I_{S2} [1 + \sin(\omega_m t + \phi)] \sin^2\left[\frac{\pi}{2} \frac{V_2}{V_{\pi/2}} + \frac{\pi}{4}\right]$$

$$I_{D4} = \tfrac{1}{2} I_{S2} [1 + \sin(\omega_m t + \phi)] \cos^2\left[\frac{\pi}{2} \frac{V_2}{V_{\pi/2}} + \frac{\pi}{4}\right]$$

The sin-squared and cosine-squared terms can be rewritten to yield:

$$I_{D1} = \tfrac{1}{2} I_{S1} [1 + \sin(\omega_m t + \phi)]\tfrac{1}{2} \left[1 + \sin\left[\pi \frac{V_1}{V_{\pi/2}}\right]\right]$$

$$I_{D3} = \tfrac{1}{2} I_{S1} [1 + \sin(\omega_m t + \phi)]\tfrac{1}{2} \left[1 - \sin\left[\pi \frac{V_1}{V_{\pi/2}}\right]\right]$$

$$I_{D2} = \tfrac{1}{2} I_{S2} [1 + \sin(\omega_m t + \phi)]\tfrac{1}{2} \left[1 + \sin\left[\pi \frac{V_2}{V_{\pi/2}}\right]\right]$$

$$I_{D4} = \tfrac{1}{2} I_{S2} [1 + \sin(\omega_m t + \phi)]\tfrac{1}{2} \left[1 - \sin\left[\pi \frac{V_2}{V_{\pi/2}}\right]\right]$$

Substituting the above values for the modulation signals $V_1$ and $V_2$, we obtain:

$$I_{D1} = \tfrac{1}{2} I_{S1} [1 + \sin(\omega_m t + \phi)]\tfrac{1}{2} \left[1 + \sin\left[\pi \frac{V_{m1}}{V_{\pi/2}} \sin\omega_m t\right]\right]$$

$$I_{D3} = \tfrac{1}{2} I_{S1} [1 + \sin(\omega_m t + \phi)]\tfrac{1}{2} \left[1 - \sin\left[\pi \frac{V_{m1}}{V_{\pi/2}} \sin\omega_m t\right]\right]$$

-continued
$$I_{D2} = \tfrac{1}{2} I_{S2} [1 + \sin(\omega_m t + \phi)]^{\tfrac{1}{2}} \left[ 1 + \sin\left[ \pi \frac{V_{m2}}{V_{\pi/2}} \sin\omega_m t \right] \right]$$

$$I_{D4} = \tfrac{1}{2} I_{S2} [1 + \sin(\omega_m t + \phi)]^{\tfrac{1}{2}} \left[ 1 - \sin\left[ \pi \frac{V_{m2}}{V_{\pi/2}} \sin\omega_m t \right] \right]$$

Assuming that $V_m << V_{x/2}$, we obtain:

$$I_{D1} \approx \tfrac{1}{2} I_{S1} [1 + \sin(\omega_m t + \phi)]^{\tfrac{1}{2}} \left[ 1 + \pi \frac{V_{m1}}{V_{\pi/2}} \sin\omega_m t \right]$$

$$I_{D3} \approx \tfrac{1}{2} I_{S1} [1 + \sin(\omega_m t + \phi)]^{\tfrac{1}{2}} \left[ 1 - \pi \frac{V_{m1}}{V_{\pi/2}} \sin\omega_m t \right]$$

$$I_{D2} \approx \tfrac{1}{2} I_{S2} [1 + \sin(\omega_m t + \phi)]^{\tfrac{1}{2}} \left[ 1 + \pi \frac{V_{m2}}{V_{\pi/2}} \sin\omega_m t \right]$$

$$I_{D4} \approx \tfrac{1}{2} I_{S2} [1 + \sin(\omega_m t + \phi)]^{\tfrac{1}{2}} \left[ 1 - \pi \frac{V_{m2}}{V_{\pi/2}} \sin\omega_m t \right]$$

Performing the multiplication yields:

$$I_{D1} \approx \tfrac{1}{4} I_{S1} \left[ 1 + \sin(\omega_m t + \phi) + \pi \frac{V_{m1}}{V_{\pi/2}} (\sin\omega_m t + \sin(\omega_m + \phi)\sin\omega_m t) \right]$$

$$I_{D3} \approx \tfrac{1}{4} I_{S1} \left[ 1 + \sin(\omega_m t + \phi) + \pi \frac{V_{m1}}{V_{\pi/2}} (\sin\omega_m t + \sin(\omega_m + \phi)\sin\omega_m t) \right]$$

$$I_{D2} \approx \tfrac{1}{4} I_{S1} \left[ 1 + \sin(\omega_m t + \phi) + \pi \frac{V_{m2}}{V_{\pi/2}} (\sin\omega_m t + \sin(\omega_m + \phi)\sin\omega_m t) \right]$$

$$I_{D4} \approx \tfrac{1}{4} I_{S1} \left[ 1 + \sin(\omega_m t + \phi) + \pi \frac{V_{m2}}{V_{\pi/2}} (\sin\omega_m t + \sin(\omega_m + \phi)\sin\omega_m t) \right]$$

The radiation is detected in photodetectors 130, 131, 134 and 135. The photocurrents from photo detectors 130 and 134 are amplified by amplifiers 132 and 136, respectively, and subtracted in subtracter 138. Likewise, the photocurrents from photodetectors 131 and 135 are amplified by amplifiers 133 and 137, respectively, and subtracted in subtracter 139.

This yields the following difference signals:

$$i_{13} = i_1 - i_3$$
$$= \tfrac{1}{2} K_1 I_{S1} \pi \frac{V_{m1}}{V_{\pi/2}} [\sin\omega_m t + \sin(\omega_m t + \phi)\sin\omega_m t]$$

$$i_{24} = i_2 - i_4$$
$$= \tfrac{1}{2} K_2 I_{S2} \pi \frac{V_{m2}}{V_{\pi/2}} [\sin \omega_m t + \sin(\omega_m t + \phi)\cos \omega_m t]$$

where $K_1$ and $K_2$ are constants of proportionality representing the polarizer efficiency, photodetector sensitivity and amplifier gain for the respective quadrature and in-phase channels. By simplifying the sine-sine and sine-cosine terms using sum and difference angles we have:

$$i_{13} = \tfrac{1}{2} K_1 I_{S1} \pi \frac{V_{m1}}{V_{\pi/2}} [\sin \omega_m t + \cos\phi - \cos(2\omega_m t + \phi)]$$

-continued
$$i_{24} = \tfrac{1}{2} K_2 I_{S2} \pi \frac{V_{m2}}{V_{\pi/2}} [\cos \omega_m t + \sin\phi - \sin(2\omega_m t + \phi)]$$

The low frequency term of $i_{13}$ contains $\cos\phi$, the quadrature component, and low frequency term of $i_{24}$ contains $\sin\phi$, the in-phase component. Low pass filters 140 and 141 have a cut off frequency below $\omega_m$, the modulation frequency. If $i_Q$ is $i_{13}$ filtered via low pass filter 140 and $i_I$ is $i_{24}$ filtered via low pass filter 141, then:

$$i_Q = K_1 I_{S1} \frac{\pi}{2} \frac{V_{m1}}{V_{\pi/2}} \cos\phi$$

$$i_I = K_2 I_{S2} \frac{\pi}{2} \frac{V_{m2}}{V_{\pi/2}} \sin\phi$$

As an alternative to the use of a separate low pass filter, either low frequency detectors 130, 131, 134, and 135, can be used or low frequency amplifiers 132, 133, 136 and 137 can be used.

The division circuit 142 forms the quotient:

$$\frac{i_I}{i_Q} = \frac{K_2 V_{m2} I_{S2}}{K_1 V_{m1} I_{S1}} \tan\phi$$

Thus:

$$\tan\phi = \frac{K_1 V_{m1} I_{S1}}{K_2 V_{m2} I_{S2}} \frac{i_I}{i_Q}$$

Note that this tangent function is well behaved if the $K_i V_{mi} I_{Si}$ terms are equal, or if they can be measured and calibrated. The quantities $V_{m1}$, $V_{m2}$, $I_{S1}$ and $I_{S2}$ depend upon the receiver circuit and thus should be controllable. Note also that the terms $K_1$ and $K_2$ are dependent upon the polarizer efficiency, the photodetector sensitivity and the amplifier gains in supposedly identical channels. Thus $K_1$ and $K_2$ can be made equal employing identical circuits. A well behaved solution can be obtained any time that $K_1 V_{m1} I_{S1}$ changes slowly relative to $K_2 V_{m2} I_{S2}$.

Arctangent circuit 144 derives the phase difference angle $\phi$ employing the function.

$$\phi = \arctan\left[ \frac{K_1 V_{m1} I_{S1}}{K_2 V_{m2} I_{S2}} \frac{i_I}{i_Q} \right]$$

As noted above the range R is determined from $\phi$ as follows:

$$R = \frac{\pi c}{\lambda_m}(2\pi m + \phi)$$

For the special case where m=0, then:

$$R = \frac{\pi c}{\lambda_m}\phi$$

Note that the above phase difference angle detection does not depend upon the amplitude-phase characteristics of any of the detector circuits. In effect, the phase difference angle is measured optically via the modulation in electro-optic modulators 124 and 125, thus preventing any amplitude-phase crosstalk from distorting the range measurement.

Figure 2:
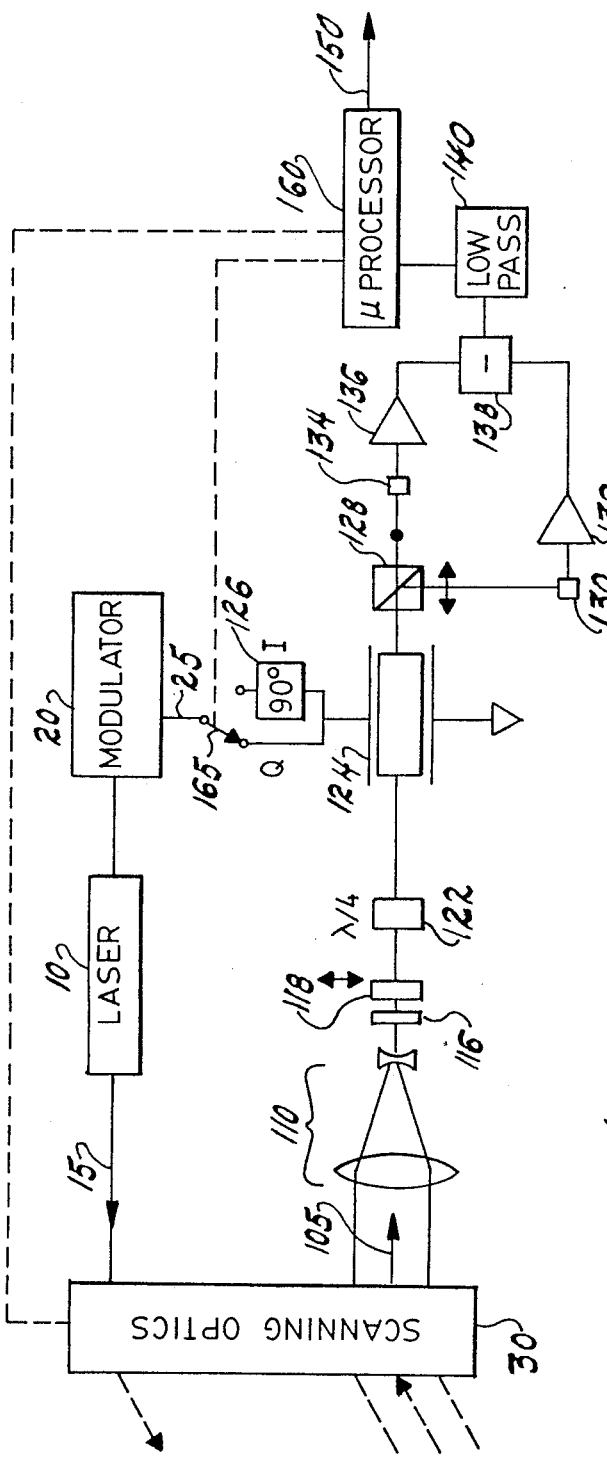
FIG. 2 illustrates a second embodiment of the present invention employing a single electro-optic modulator and switching between detection of in-phase and quadrature modulation.

FIG. 2 illustrates an alternative embodiment of the present invention. In FIG. 2 a single channel is employed rather than the two channels illustrated in FIG. 1.

FIG. 2 shows laser 10 producing a beam of light 15, having its light output modulated by modulator 20, which also generates reference RF signal 25. Scanning optics 30 scans the scene in the manner previously described. The received light 105 is received via an optical system 110. The received light 105 is filtered by optical band pass filter 116. The received light 105 is next passed through a linear polarizer 118, in the manner previously described. The received light 105 passes through quarter wave plate 122 and electro-optic modulator 124. The voltage applied to electro-optic modulator 124 is either the reference RF signal 25 from modulator 20 or the reference RF signal 25 phase shifted by 90 degree phase shift circuit 126 as selected by switch 165. Light from electro-optic modulator 124 passes through polarization analyzer 128, which separates this light into two beams of perpendicular linear polarizations. The parallel polarized beam is detected by photodetector 130 whose photo current is amplified by amplifier 132. The perpendicular polarized beam is detected by photo detector 134 with the resulting photo current amplified by amplifier 136. The resultant voltages are subtracted in subtraction circuit 138 and passed through low pass filter 140. This single channel is identical to each of the two channels illustrated in FIG. 1.

The output from low pass filter 140 is supplied to microprocessor 160. Microprocessor 160 is a digital control device. Microprocessor 160 preferably includes an analog-to-digital converter which converts the analog output from low pass filter 140 into a digital signal which can be manipulated by microprocessor 160. Microprocessor 160 controls the position of switch 165 and computes the range from successive outputs from low pass filter 140. Microprocessor 160 operates in synchronism with scanning optics 30 as illustrated in the dashed line. This can take place by having microprocessor 160 operate scanning optics 30 or by slaving microprocessor 160 to scanning optics 30.

Microprocessor 160 operates as follows. Firstly, microprocessor controls switch 165 to couple the phase shifted modulation signal from 90 degree phase shift circuit 126 to electro-optic modulator 124. Microprocessor 160 then samples and stores the output of low pass filter 140. In accordance with the prior discussion of FIG. 1, the output $i_I$ low pass filter 140 is:

$$i_I = KI_S\frac{\pi}{2}\frac{V_m}{V_{\pi/2}}\sin\phi$$

where K is a constant of proportionality representing the polarizer efficiency, photodetector sensitivity and amplifier gain, $I_s$ is the input light intensity, and $V_m$ is the reference RF signal 25 voltage from modulator 20.

Microprocessor 160 next controls switch 165 to couple the reference RF signal 25 to electro-optic modulator 124. Microprocessor 160 then samples and stores the output of low pass filter 140. In accordance with the prior discussion of FIG. 1, the output $i_Q$ of low pass filter 140 is:

$$i_Q = KI_S\frac{\pi}{2}\frac{V_m}{V_{\pi/2}}\cos\phi$$

Microprocessor 160 then has the information needed to compute the phase difference angle $\phi$ and the range R. The phase difference angle $\phi$ is computed as follows:

$$\phi = \arctan\left[\frac{i_I}{i_Q}\right]$$

that the K, $I_s$ and $V_m$ terms cancel out. The range R can then be determined from $\phi$ as discussed above.

Microprocessor 160 repeats these steps for each small region illuminated by laser 10 and viewed by optical system 110 during the scan of the scene to be imaged by scanning optics 30. As previously discussed, either microprocessor 160 controls this scanning optics 30 or it is synchronized to scanning optics 30.

The embodiment illustrated in FIG. 2 is advantageous over the previous embodiment illustrated in FIG. 1, because it requires less hardware to implement the process. In addition, because the same hardware is used for the in-phase and quadrature channels, there is no need for precise matching between channels to produce an accurate result. Because the embodiment of FIG. 2 must view each small area twice in order to calculate the range R, it supports a slower maximum rate of scan of the scene to be imaged than the previous embodiment. In some applications this trade of equipment for time will be desirable, in other applications the embodiment of FIG. 1 is preferred.

Figure 3:
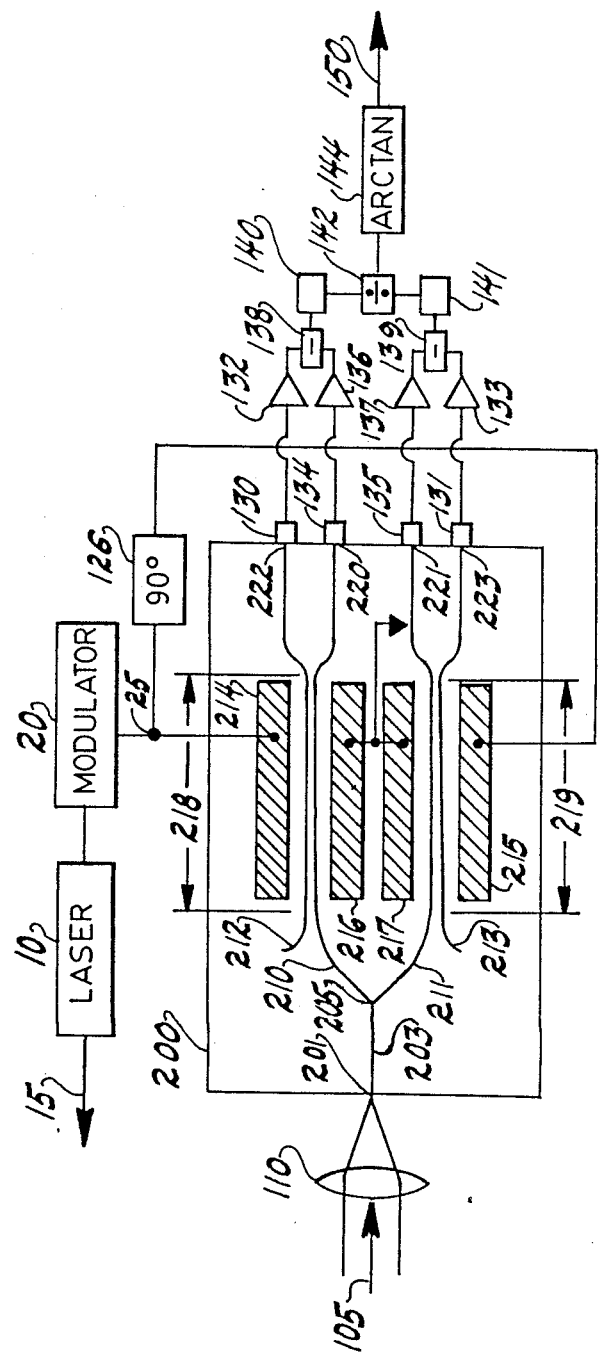
FIG. 3 illustrates an alternative embodiment of the present invention employing an integrated optic device.

FIG. 3 illustrates an apparatus for implementation of the present invention employing an integrated optics device. In accordance with the prior art, integrated optics device 200 is constructed with a substrate of an electro-optic crystal such as lithium niobate (LiNbO$_3$). Optical wave guides are typically formed within this substrate via titanium diffusion. These optical wave guides can thus be placed in any location on substrate 200 in a pattern analogous to the conduction patterns on a printed circuit board.

The embodiment of the invention illustrated in FIG. 3 includes many of the parts previously illustrated in FIG. 1. Scanning optics 30 is omitted from FIG. 3 for simplicity. FIG. 3 includes laser 10 producing a beam of light 15, modulator 20, received light 105 and optical system 110. FIG. 3 also includes: 90 degree phase shift circuit 126; photodetectors 130, 131, 134 and 135; amplifiers 132, 133, 136 and 137; difference circuits 138 and 139; low pass filters 140 and 141; division circuit 142; and arctangent circuit 144. These circuits are identical in function to the corresponding circuits illustrated in FIG. 1.

Optical system 110 gathers the beam of light 105 and focuses it onto wave guide input 201. Wave guide input 201 is on one edge of the integrated optics device 200 and is one end of wave guide 203. Received light gathered by optical system 110 thus enters wave guide 203 via wave guide input 201. The light in wave guide 203 is split in Y-coupler 205. Preferably equal amounts of light are coupled to wave guide 210 and to wave guide 211.

Wave guide 210 passes in close coupling with matched wave guide 212 within region 218 and is connected to wave guide output 220. Wave guide output 220 is connected to photodetector 134. The matched wave guide 212 is similarly connected to wave guide output 222 and hence to photodetector 130. Electrodes 214 and 216 ar disposed on either side of the parallel wave guides 210 and 212 in the region 218. Electrode 214 receives the reference RF signal 25 from modulator 20. Electrode 216 is grounded. Wave guide 211 passes in close coupling with matched wave guide 213 within region 219 and is connected via wave guide output 220 to photodetector 135. Matched wave guide 213 is similarly connected via wave guide output 223 to photodetector 131. Electrodes 215 and 217 are disposed on either side of the parallel wave guides 211 and 213, in a fashion similar to electrodes 214 and 216. Electrode 215 is connected to 90 degree phase shift circuit 126 while electrode 217 is grounded.

The parallel regions 218 and 219 together with the corresponding electrodes 214, 216, 215 and 217 act in a fashion similar to electro-optic modulators 124 and 125. Within region 218 wave guides 210 and 212 run closely parallel, separated by a distance on the order of a few micrometers. This close spacing and the fact that these wave guides are closely matched in character, causes the evanescent wave from wave guide 210 to be coupled to wave guide 212 to produce a traveling wave in wave guide 212. The length of the region 218 is selected so that the light energy is almost completely coupled from wave guide 210 into wave guide 212. If no voltage is applied, this results in most of the radiation being detected in photodetector 130 with very little radiation detected by photodetector 134. The voltage applied between electrodes 214 and 216 causes fringing fields in the integrated optics structure. This distorts the wave guides 210 and 212 and degrades the coupling between them. A degraded coupling means that less light is detected at photodetector 130 and more light is detected at photodetector 134. This degradation of the coupling process has a nearly sine-squared transfer function in applied voltage V similar to that of the electro-optic modulators 124 and 125. Quarter wave bias analogous to that provided by quarter-wave plate 122 can be provided by a DC bias in the applied voltage V. A similar coupling taking place between wave guides 211 and 213 is influenced by the electrodes 215 and 217. Thus the structure illustrated in FIG. 3 operates in a fashion similar to that illustrated in FIG. 1.

The integrated optics embodiment illustrated in FIG. 3 is advantageous over the structure of FIG. 1 for several reasons. The integrated optics embodiment provides a more compact structure and reduces the optical alignment problems because much of the light paths are embodied in the electro-optic device 200. In addition, this embodiment tends to reduce the power consumption. This reduction in power consumption is due to the fact that the half-wave voltage $V_{\pi/2}$ of the electro-optic embodiment is on the order of volts while $V_{\pi/2}$ for bulk electro-optic modulators 124 and 125 is on the order of several kilovolts. Thus the driver circuits for the integrated optics embodiment are smaller and consume less power.

I claim:

1. A method for detecting the phase difference between a reference RF signal and the modulation of a received optical beam comprising:

modulating said received optical beam by the reference RF signal thereby producing an RF modulated first optical beam;

detecting the first difference cross modulation in said RF modulated first optical beam between the modulation of the received optical beam and said modulation by the reference RF signal;

generating a phase shift reference RF signal having a ninety degree phase shift from the reference RF signal;

modulating said received optical beam by the phase shift reference RF signal thereby producing an RF modulated second optical beam;

detecting the second difference cross modulation in said RF modulated second optical beam between the modulation of the received optical beam and said modulation by the phase shift reference RF signal;

dividing the second difference cross modulation of said RF modulated second optical beam by the first difference cross modulation of said RF modulated first optical beam, said quotient being proportional to tangent of the phase difference to be detected.

2. The method as claimed in claim 1, wherein:

said steps of modulating said received optical beam by the reference RF signal thereby producing a modulated first optical beam and modulating said received optical beam by the phase shift reference RF signal thereby producing a modulated second optical beam includes the steps of splitting the received optical beam into first and second optical beams of approximately equal intensity, modulating said first optical beam by the reference RF signal thereby producing said modulated first optical beam, and modulating said second optical beam by the phase shift reference RF signal thereby producing said modulated second optical beam.

3. The method as claimed in claim 1, wherein:

said steps of modulating said received optical beam by the reference RF signal and modulating said received optical beam by the phase shift reference RF signal thereby producing a modulated second optical beam includes the steps of sequentially modulating said received optical beam by the reference RF signal thereby producing said modulated first optical beam, followed by modulating said received optical beam by the phase shift reference RF signal thereby producing a modulated second optical beam;

said step of detecting the first difference cross modulation in said modulated first optical beam between the modulation of the received optical beam and said modulation by the reference RF signal includes the steps of detecting a first difference cross modulation in said received optical beam between the modulation of the received optical beam and said modulation by the reference RF signal during the time said received optical beam is modulated by the reference RF signal, -storing said first difference cross modulation;

said step of detecting the second difference cross modulation in said modulated second optical beam between the modulation of the received optical beam and said modulation by the phase shift reference RF signal includes the steps of detecting a second difference cross modulation in said received optical beam between the modulation of the received optical beam and said modulation by the reference RF signal during the time said received optical beam is modulated by the phase shift reference RF signal, storing said second difference cross modulation; and said step of dividing the second difference cross modulation of said modulated second optical beam by the first difference cross modulation of said modulated first optical beam includes recall of the stored first and second difference cross modulations.

4. The method as claimed in claim 1, further comprising the steps of:

generating a coherent optical beam;

modulating said coherent optical beam by the reference RF signal thereby producing a modulated coherent optical beam; and directing said modulated optical beam to a target, said received optical beam being the light reflected from the target;

wherein said detected phase difference angle is a measure of the distance to the target.

5. An electro-optic phase detection system for detecting the phase difference between a reference RF signal and the modulation of a received optical beam comprising:

a beam splitter for splitting the received optical beam into first and second optical beams of approximately equal intensity;

a first electro-optical modulator disposed in the path of said first optical beam and electrically connected to the reference RF signal for amplitude modulating respective parallel and perpendicular polarizations of said first optical beam by the reference RF signal thereby producing a modulated first optical beam;

a first polarization analyzer disposed in the path of said modulated first optical beam for splitting said first optical beam into a first parallel polarization optical beam and a first perpendicular polarization optical beam;

a first parallel optical beam detector disposed in the path of said first parallel polarization optical beam for generating a first parallel electrical signal corresponding to the instantaneous light intensity of said first parallel polarization optical beam;

a first perpendicular optical beam detector disposed in the path of said first perpendicular polarization optical beam for generating a first perpendicular signal corresponding to the instantaneous light intensity of said first perpendicular optical beam;

a first difference device connected to said first parallel optical beam detector and said first perpendicular optical beam detector for forming a first difference signal from said first parallel electrical signal and said first perpendicular electrical signal;

a phase shift device connected to the reference RF signal for generating a phase shift reference RF signal having a ninety degree phase shift from the reference RF signal;

a second electro-optical modulator disposed in the path of said second optical beam and electrically connected to said phase shift device for amplitude modulating respective parallel and perpendicular polarizations of said second optical beam by the phase shift signal of said phase shift device thereby producing a modulated second optical beam;

a second polarization analyzer disposed in the path of said modulated second optical beam for splitting said second optical beam into a second parallel polarization optical beam and a second perpendicular optical beam;

a second parallel optical beam detector disposed in the path of said second parallel polarization optical beam for generating a second parallel electrical signal corresponding to the instantaneous light intensity of said second parallel polarization optical beam;

a second perpendicular optical beam detector disposed in the path of said second perpendicular polarization optical beam for generating a second perpendicular electrical signal corresponding to the instantaneous light intensity of said second perpendicular polarization optical beam;

a second difference device connected to said second parallel optical beam detector and said second perpendicular optical beam detector for forming a second difference signal from said second parallel electrical signal and said second perpendicular electrical signal;

a division circuit connected to said first and second difference devices for forming the quotient of said second difference signal divided by said first difference signal, said quotient being proportional to the phase difference to be detected.

6. The electro-optic phase detection system as claimed in claim 5, further comprising:

a first low pass filter connected between said first difference device and said quotient device for producing a low frequency first difference signal;

a second low pass filter connected between said second difference device and said quotient device for producing a low frequency second difference signal;

whereby said division circuit forms the quotient of said low frequency second difference signal divided by said low frequency first difference signal, said quotient being proportional to the phase difference to be detected.

7. The electro-optic phase detection system as claimed in claim 5, further comprising:

a light source for producing a coherent optical beam;

a reference oscillator for generating the reference RF signal;

an optical modulator connected to said light source and said reference oscillator for modulating said coherent optical beam by the reference RF signal thereby producing a modulated coherent optical beam; and an optical system disposed to receive said modulated coherent optical beam for directing said modulated optical beam to a target and for receiving light reflected from the target as said received optical beam;

wherein said detected phase difference angle is a measure of the distance to the target.

8. The electro-optic phase detection system as claimed in claim 7, further comprising:
a linear polarizer disposed in the path of the reflected optical beam prior to said beam splitter for filtering out of said received optical beam light having a component of linear polarization parallel to the polarization of said coherent optical beam source.

9. The electro-optic phase detection system as claimed in claim 7, further comprising:
a linear polarizer disposed in the path of the reflected optical beam prior to said beam splitter for filtering out of said received optical beam light having a component of linear polarization perpendicular to the polarization of said coherent optical beam source.

10. The electro-optic phase detection system as claimed in claim 5, further comprising:
a first quarter wave plate disposed in the path of said first optical beam between said beam splitter and said first electro-optical modulator producing a phase shift of one quarter of the wavelength of the received optical beam, thereby producing circularly polarized light; and
a second quarter wave plate disposed in the path of said second optical beam between said beam splitter and said second electro-optical modulator producing a phase shift of one quarter of the wavelength of the received optical beam, thereby producing circularly polarized light.

11. An electro-optic phase detection system for detecting the phase difference between a reference RF signal and the modulation of a received optical beam comprising:
an electro-optical modulator disposed in the path of said received optical beam having an electrical input terminal for amplitude modulating respective parallel and perpendicular polarizations of said received optical beam by the signal received on said electrical input terminal thereby producing a modulated optical beam;
a polarization analyzer disposed in the path of said modulated optical beam for splitting said optical beam into an parallel optical beam and a perpendicular optical beam;
a parallel optical beam detector disposed in the path of said parallel optical beam for generating a parallel electrical signal corresponding to the instantaneous light intensity of said parallel optical beam;
a perpendicular optical beam detector disposed in the path of said perpendicular optical beam for generating a parallel electrical signal corresponding to the instantaneous light intensity of said perpendicular optical beam;
a difference device connected to said parallel optical beam detector and said perpendicular optical beam detector for forming a difference signal from said parallel electrical signal and said perpendicular electrical signal;
a phase control device connected between the modulation source and said electrical input terminal of said electro-optical modulator, including a phase shift device for generating a phase shift reference RF signal having a ninety degree phase shift from the reference RF signal, said phase control device for alternately connecting to said electrical input terminal of said electro-optic modulator to the reference RF signal and to said phase shift reference RF signal;
a storage means for storing said difference signal when said phase control device connects one of the reference RF signal or said phase shift reference RF signal to said electrical input terminal of said electro-optic modulator; and
a division circuit connected to said difference device and said storage means for forming the quotient of said difference signal formed when said phase control device connects said phase shift reference RF signal to said electrical input terminal of said electro-optic modulator divided by said difference signal connects the modulation source to said electric input terminal of said electro-optic modulator, said quotient being proportional to the phase difference to be detected.

12. The electro-optic phase detection system as claimed in claim 11, further comprising:
a low pass filter connected between said difference device and said quotient device for producing a low frequency difference signal;
whereby said division circuit forms the quotient of said low frequency second difference signal divided by said low frequency first difference signal, said quotient being proportional to the phase difference to be detected.

13. The electro-optic phase detection system as claimed in claim 11, further comprising:
a quarter wave plate disposed in the path of said received optical beam between said beam splitter and said electro-optical modulator producing a phase shift of one quarter of the wavelength in the received optical beam, thereby producing circularly polarized light.

14. The electro-optic phase detection system as claimed in claim 11, further comprising:
a light source for producing a coherent optical beam;
a reference oscillator for generating the reference RF signal;
a optical modulator connected to said light source and said reference oscillator for modulating said coherent optical beam by the reference RF signal thereby producing a modulated coherent optical beam; and
an optical system disposed to receive said modulated coherent optical beam for directing said modulated optical beam to a target and for receiving light reflected from the target as said received optical beam;
wherein said detected phase difference angle is a measure of the distance to the target.

15. The electro-optic phase detection system as claimed in claim 14, further comprising:
a linear polarizer disposed in the path of the reflected optical beam prior to said beam splitter for filtering out of said received optical beam light having a component of linear polarization parallel to the polarization of said coherent optical beam source.

16. The electro-optic phase detection system as claimed in claim 14, further comprising:
a linear polarizer disposed in the path of the reflected optical beam prior to said beam splitter for filtering out of said received optical beam light having a component of linear polarization perpendicular to the polarization of said coherent optical beam source.

17. An electro-optic phase detection system for detecting the phase difference between a reference RF signal and the modulation of a received optical beam comprising:

an integrated optic device including
- an optical input for receiving the received optical beam,
- a first optical wave guide having a first end coupled to said optical input and a second end,
- a Y-coupler having an input branch connected to said first end of said first optical wave guide and first and second output branches,
- a second wave guide having a first end connected to said first output branch of said Y-coupler, a modulation section and a second end,
- a first optical output connected to said second end of said second wave guide for outputting from said integrated optic device light from said second wave guide,
- a third wave guide having a first end terminated within said integrated optical device, a modulation section disposed parallel in proximity to said modulation section of said second wave guide and a second end,
- a second optical output connected to said second end of said third wave guide for outputting from said integrated optic device light from said third wave guide,
- a set of first electrodes disposed on either side of said modulation sections of said second and third wave guides,
- a fourth wave guide having a first end connected to said second output branch of said Y-coupler, a modulation section and a second end,
- a third optical output connected to said second end of said fourth wave guide for outputting from said integrated optic device light from said fourth wave guide,
- a fifth wave guide having a first end terminated within said integrated optical device, a modulation section disposed parallel in proximity to said modulation section of said fourth wave guide and a second end,
- a fourth optical output connected to said second end of said fifth wave guide for outputting from said integrated optic device light from said fifth wave guide,
- a set of second electrodes disposed on either side of said modulation sections of said fourth and fifth wave guides,
- means for applying the reference RF signal across said set of first electrodes;

a phase shift device connected to the reference RF signal for generating a phase shift reference RF signal having a ninety degree phase shift from the reference RF signal;

means for applying said phase shift reference RF signal across said set of second electrodes;

a first in-phase optical beam detector disposed to receive light from said first optical output for generating a first in-phase electrical signal corresponding to the instantaneous light intensity of the light received from said first optical output;

a first quadrature optical beam detector disposed to receive light from said second optical output for generating a first quadrature electrical signal corresponding to the instantaneous light intensity of light received from said second optical output;

a first difference device connected to said first in-phase optical beam detector and said first quadrature optical beam detector for forming a first difference signal from said first in-phase electrical signal and said first quadrature electrical signal;

a second in-phase optical beam detector disposed to receive light from said third optical output for generating a second in-phase electrical signal corresponding to the instantaneous light intensity of light received from said second optical output;

a second quadrature optical beam detector disposed to receive light from said fourth optical output for generating a second quadrature electrical signal corresponding to the instantaneous light intensity of light received from said fourth optical output;

a second difference device connected to said second in-phase optical beam detector and said second quadrature optical beam detector for forming a second difference signal from said second in-phase electrical signal and said second quadrature electrical signal; and a division circuit connected to said first and second difference devices for forming the quotient of said second difference signal divided by said first difference signal, said quotient being proportional to the phase difference to be detected.

18. The electro-optic phase detection system as claimed in claim 17, wherein:
said modulation section of said third wave guide has a length whereby substantially all of the light energy within said second wave guide is transferred to said third wave guide; and
said modulation section of said fifth wave guide has a length whereby substantially all of the light energy within said fourth wave guide is transferred to said fifth wave guide in the absence of voltage applied across said set of second electrodes.

19. The electro-optic phase detection system as claimed in claim 17, further comprising:
a light source for producing a coherent optical beam;
a reference oscillator for generating the reference RF signal;
an optical modulator connected to said light source and said reference oscillator for modulating said coherent optical beam by the reference RF signal thereby producing a modulated coherent optical beam; and
an optical system disposed to receive said modulated coherent optical beam for directing said modulated optical beam to a target and for receiving light reflected from the target as said received optical beam;
wherein said detected phase difference angle is a measure of the distance to the target.

* * * * *

UNITED STATES PATENT AND TRADEMARK OFFICE
CERTIFICATE OF CORRECTION

PATENT NO. : 4,957,362
DATED : September 18, 1990
INVENTOR(S) : Lauren M. Peterson It is certified that error appears in the above-identified patent and that said Letters Patent is hereby corrected as shown below:

Column 4, line 35, "modulation The" should be --modulation. The--;

Column 5, line 47, "frequency is" should be --frequency $\omega_m$ is;

Column 5, line 48, "number $\omega_m$" should be --number m--;

Column 5, line 66, "V $_{x/2}$" should be --V $_{x/2}$ --;

Column 6, line 23, "134, 133 and" should be 134, 132, 133 and--;

Column 7, line 10, "V$_{x/2}$" should be --V $_{x/2}$ --;

Column 10, line 28, "that the" should be --Note that the--;

Column 11, line 18, "ar" should be --are--.

Signed and Sealed this

Twenty-eighth Day of January, 1992

Attest:

HARRY F. MANBECK, JR.

*Attesting Officer*     *Commissioner of Patents and Trademarks*